United States Patent Office 2,943,439
Patented July 5, 1960

2,943,439

METHOD OF PROPELLING ROCKETS AND ROCKET FUELS

Cleveland R. Scott, Bartlesville, Okla., assignor to Phillips Petroleum Company, a corporation of Delaware No Drawing. Filed May 19, 1952, Ser. No. 288,751

34 Claims. (Cl. 60—35.4)

This invention relates to rocket fuels. In one of its more specific aspects, this invention relates to hypergolic fuels. In another of its more specific aspects, this invention relates to a method for propelling rockets.

My invention is concerned with new and novel rocket propellants and their utilization. A rocket or jet propulsion device, such as is discussed herein is defined as a rigid container for matter and energy, so arranged that a portion of the matter can absorb the energy in kinetic form and subsequently eject it in a specified direction. The type rocket to which my invention is applied is that type of rocket propulsion device designated as a "pure" rocket, i.e., a thrust producer which does not make use of the surrounding atmosphere. A rocket of the type with which my invention is concerned is propelled in response to the steps of introducing a propellant material into a combustion chamber therein, and burning it under conditions that will cause it to release energy at a high but controllable rate immediately after its entry into the combustion chamber. Rocket propellants, in liquid form are advantageously utilized inasmuch as the liquid propellant material can be carried in a light weight, low pressure vessel and thereafter pumped into the combustion chamber. It is thus necessary, that the combustion chamber, although being strong enough to withstand high pressure and temperature, need be only large enough to insure combustion. The flow of liquid propellant into the combustion chamber can be regulated at will so that the thrust resulting from continuous or intermittent bursts of power can be sustained. Intermittent burning of the fuel contributes to a longer life of the combustion chamber and of the thrust nozzle. Various methods and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen. Additional known bipropellants include nitric acid as the oxidizer with aniline or furfuryl alcohol as the hypergolic fuel component.

When employing 90–100 percent nitric acid, i.e., "white fuming nitric acid" as the oxidizer in a rocket bipropellant, it is often necessary, dependent upon the specific fuel component, to obtain more rapid ignition than would normally be obtained by dissolving from 6 to 14 percent by weight of nitrogen dioxide in the white fuming acid, thereby forming "red fuming" nitric acid. A fuel component of the bipropellant-material of the type described herein, is spontaneously ignited upon contacting the oxidizer. For this reason such a bipropellant-material is referred to herein as being "hypergolic." A ratio of oxidizer to hypergolic fuel based upon stoichiometric amounts can be utilized within the limits of 0.5:1 to 1.5:1 if desired. The efficiency of combustion is less at a ratio below 1:1 and the use of the oxidizer is less economical at ratios above 1:1. However, practical consideration may necessitate the use of higher ranges, even as high as 6:1.

At least one of the following objects of the invention will be attained by at least one of the aspects of this invention.

An object of this invention is to provide new rocket propellants. Another object of the invention is to provide novel hypergolic fuels. Another object of the invention is to provide a method for producing immediate thrust to a rocket-type device. Another object is to provide improved fast burning fuels. Other and further objects will be apparent to those skilled in the art upon study of the accompanying disclosure.

In accordance with the broad aspect of this invention, I have found that mixtures of five membered, heterocyclic compounds containing one nitrogen and four carbon atoms in the ring and selected mercaptans, both more fully set forth hereinbelow, either in the presence or absence of a hydrocarbon fuel, form a fuel component which is highly "hypergolic," suitable for use in the propulsion of rockets, guided missiles, and the like in conjunction with an oxidizer. The fuel mixtures of the present invention are composed of a heterocyclic compound referred to above and a selected mercaptan, either component being suitable for use in a major or in a minor amount. Preferably mixtures containing at least ten mol percent of the heterocyclic compound and not more than 90 percent thereof will be employed. In general, the heterocyclic compound constituent of this invention is characterized by the following structural formulae:

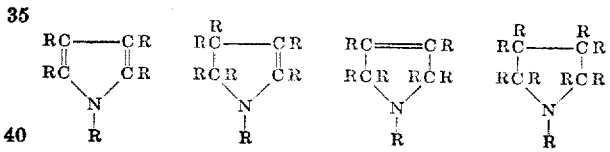

wherein R is selected from the group consisting of hydrogen, alkyl, alkenyl, aryl, aralkyl and alkaryl radicals having not more than 12 carbon atoms and cycloalkyl and cycloalkenyl radicals having from 5 to 6 carbon atoms and wherein the total number of carbon atoms present in a molecule is not greater than 16. The hydrogen atom and alkyl radicals are preferred. It is preferred that the dihydro- and tetrahydropyrroles such as pyrroline and its hydrocarbon derivatives and pyrrolidine and its hydrocarbon derivatives, respectively, contain at least one hydrogen atom attached to each of the saturated and/or unsaturated carbon atoms in the nuclear ring structure. As a further preferred embodiment, it is preferred that R be an alkyl group containing not more than 3 carbon atoms when alkyl pyrroles are used.

Illustrative of the hypergolic heterocyclic compounds of my invention are, pyrrole and pyrrolidine, N-n-butylpyrrole, 2,5-dimethyl-1-phenylpyrrole, N-allylpyrrole, 2-($\alpha,\gamma$-butadienyl) pyrrole, N-isoamylpyrrole, 2,5-diallylpyrrole, N-benzylpyrrole, 2-methyl-5-phenylpyrrole, 1,2-dimethyl-4-phenylpyrrole, 1,3-diphenylpyrrole, 2,4-dimethyl-3,5-diethylpyrrole, 2,3,4,5-tetraethylpyrrole, 2,4-dimethylpyrrole, N-ethylpyrrole, 2-methylpyrrole, N-n-propylpyrrole, 2,4-dihexylpyrrole, 2-decyl-4-methylpyrrole, 2-dodecylpyrrole, 2-vinyl-4-octylpyrrole, 2,4-dibutenylpyrrole, 2-dodecenylpyrrole, 2-isopropylphenyl-4-propylpyrrole, 2-cyclohexylpyrrole, 2-cyclohexenylpyrrole, N-cyclopentenylpyrrole, N-$\alpha$-naphthylpyrrole, N-o-tolylpyrrole, $\Delta^2$-pyrroline, 2-methyl-1-paratolyl-$\Delta^2$-pyrroline, 1,2-dimethyl-5-isopropyl-$\Delta^4$-pyrroline, 1-benzyl-$\Delta^3$-pyrroline, N-dodecylpyrroline, N-allylpyrroline, 2-decenylpyrroline, N-cyclopentylpyrroline, 2-cyclohexylpyrroline, Δ³-pyrroline, 2-methyl-Δ³-pyrroline, 2-benzyl-Δ³-pyrroline, N-cyclopentenylpyrroline, 2-cyclohexenylpyrroline, 2-methyl-1-para-tolylpyrrolidine, N-ethylpyrrolidine, N-propylpyrrolidine, 1-methyl - 2 - propylpyrrolidine, 2-butylpyrrolidine, 2,5-dimethyl - 3 - allylpyrrolidine, 2-phenylpyrrolidine, N-benzylpyrrolidine, 2-cyclohexylpyrrolidine, 2-cyclopentylpyrrolidine, N-dodecenylpyrrolidine, 2-cyclohexenylpyrrolidine, N-cyclopentenylpyrrolidine, N-o-tolylpyrrolidine, N-methylpyrrolidine, 2,4-dimethylpyrrolidine, 2-isopropylphenylpyrrolidine, 2,3,4,5-tetramethylpyrrolidine.

Mercaptans which form a portion of the hypergolic fuel constituent of this invention in admixture with the above described heterocyclic compounds include tert-butyl mercaptan, tert-hexyl mercaptan, and tert-octyl mercaptan.

The fuel constituent of the present invention, i.e., mixtures consisting of the heterocyclic compound and a mercaptan are hypergolic in an undiluted state and are also hypergolic when admixed with non-hypergolic materials, particularly hydrocarbons, even in a state of dilution as high as from 10 to 90 percent by volume when white fuming nitric acid is used as the oxidant. Suitable non-hypergolic diluents which also form a portion of the fuel composition include paraffin, cycloparaffin, olefin, cycloolefin, or aromatic hydrocarbons in the $C_5$ to $C_{35}$ range or mixtures thereof, preferably the normally liquid materials. Examples of such hydrocarbon fuels are gasoline, naphtha, n-hexane, n-heptane, benzene, kerosene, isooctane, diisobutylene, cyclohexene, cyclohexane, isodecane, methylcyclohexane, toluene, hexadecane, eicosane, hexacosane, tetratriacontane, picene, cyclononacosane, tetraphenylethylene, and the like. Hydrocarbons in the $C_5$ to $C_{16}$ range are preferred.

Other oxidizers are suitable oxidants for these hypergolic fuels in addition to white or red fuming nitric acid and can be used in the bipropellant fuel compositions of our invention. Suitable oxidants include materials such as hydrogen peroxide, ozone, nitrogen tetroxide, liquid oxygen, and mixed acids, especially anhydrous mixtures of nitric and sulfuric acids such as 80–90 percent by volume white or red fuming nitric acids and 10 to 20 percent by volume anhydrous or fuming sulfuric acid. It is within the scope of this invention to employ, preferably dissolved in the oxidizer, ignition catalysts or oxidation catalysts. These oxidation catalysts include certain metal salts, such as the chlorides and naphthenates of iron, zinc, cobalt and similar heavy materials.

As an added feature of this invention, the heterocyclic compound-mercaptan mixtures of this invention are also useful for providing fast burning fuels suitable for use in rocket engines and the like where a hypergolic fuel is not necessarily required. For example, the fuel components of this invention are dispersed in a hydrocarbon, such as a hydrocarbon diluent described above. Even if the resulting solution is not hypergolic with an oxidant such as fuming nitric acid, it can be used together with an oxidant and a suitable igniter as a rocket propellant. These fast burning fuels are particularly useful if, for various reasons a hypergolic fuel is not desired or required. The heterocyclic compound-mercaptan mixtures of this invention may be added to a hydrocarbon fuel in a minor amount, usually from 1 to 20 percent by volume of the total mixture to produce fast burning fuels. Suitable fast burning fuels comprise from 1–10 percent by volume of a heterocyclic compound-mercaptan mixture described above with 90–99 percent by volume of a petroleum fraction in the gasoline boiling range. Specifically such a fuel can comprise between 1 and 20 percent by volume of a mixture of 20 percent heterocyclic compound and 80 percent tert-butyl mercaptan and 80–99 percent by volume n-heptane.

The advantages of this invention are illustrated in the following examples. The reactants and their proportions and their specific ingredients are presented as being typical and are not to be construed as unduly limiting the invention.

EXAMPLE I

Each of the fuel mixtures described hereinbelow was tested for spontaneous ignition employing fuming nitric acid as the oxidizer. In each test, 0.13 ml. of the pure material or a diluted solution thereof was dropped into a 1 x 8 inch test tube containing 0.3 ml. of fuming nitric acid. The temperature of the fuel and oxidant was lowered to —40° F. before mixing. The inert diluent was employed to determine the maximum amount of dilution which each fuel would tolerate and retain its hypergolic properties. The results are set forth hereinbelow in Table I.

*Table I*

| Fuel | Oxidant | Percent dilution |
|---|---|---|
| 20% pyrrole¹<br>80% tert-butyl mercaptan | White Fuming Nitric Acid | 60 n-heptane. |
| 10% pyrrole<br>90% tert-butyl mercaptan | Red Fuming Nitric Acid | 10 n-heptane. |
| Pyrrole | Red Fuming Nitric Acid | 30 toluene. |
| Pyrrole | White Fuming Nitric Acid | 70 toluene. |
| Tert-butyl mercaptan | Red Fuming Nitric Acid | No Ignition. |
| Tert-butyl mercaptan | White Fuming Nitric Acid | No Ignition. |

¹ Percent by volume.

The results set forth in Table I show that although tert-butyl mercaptan is not hypergolic by itself under these test conditions, a mixture of a minor amount of the heterocyclic compound of this invention and a major amount of tert-butyl mercaptan is hypergolic at —40° F.

EXAMPLE II

A mixture of the first fuel of Table I was tested in the same manner with the same oxidant while utilizing an inert diluent and maintaining the fuel and oxidant at 70° F. The dilution which this fuel mixture tolerated at 70° F. while retaining its hypergolic properties was once again 60 percent by volume.

EXAMPLE III

Each of the fuel mixtures described hereinbelow was tested for spontaneous ignition employing fuming nitric acid as the oxidizer. In each test, 0.13 ml. of the pure material or a diluted solution thereof was dropped into a 1 x 8 inch test tube containing 0.3 ml. of fuming nitric acid to determine the maximum amount of dilution which the fuels tolerated at 70° F. while retaining their hypergolic properties. The results are set forth below as Table II.

*Table II*

| Fuel | Oxidant | Percent Dilution with n-heptane |
|---|---|---|
| N-n-butylpyrrole | WFNA<br>RFNA | 60<br>Ignition. |
| 20% N-n-butylpyrrole<br>80% tert-butyl mercaptan | WFNA<br>RFNA | 10<br>20 |
| Pyrrolidine | RFNA<br>WFNA | 10<br>10 |
| 20% Pyrrolidine<br>80% tert-butyl mercaptan | WFNA<br>RFNA | 20<br>10 |

As will be evident to those skilled in the art, various modifications of this invention can be made or followed in the light of this disclosure without departing from the spirit or the scope of this invention.

I claim:

1. A method for applying immediate thrust to a mass, comprising introducing separate streams of an oxidant and fuel components of a bipropellant into contact with each other in a combustion chamber of a reaction motor in such proportions as to produce spontaneous ignition, said fuel component comprising a mixture of from 10 to 90 mol percent of a 5-membered heterocyclic compound containing one nitrogen and four carbon atoms in the ring and having not more than 16 carbon atoms per molecule, and from 90 to 10 mol percent of a mercaptan selected from the group consisting of tert-butyl mercaptan, tert-hexyl mercaptan, and tert-octyl mercaptan.

2. The method of claim 1 wherein said heterocyclic compound is pyrrole.
3. The method of claim 1 wherein said heterocyclic compound is pyrrolidine.
4. The method of claim 1 wherein said heterocyclic compound is pyrroline.
5. The method of claim 1 wherein said heterocyclic compound is N-n-butylpyrrole.
6. The method of claim 1 wherein said heterocyclic compound is N-ethylpyrrolidine.
7. The method of claim 1 wherein said mercaptan is tert-butyl mercaptan.
8. The method of claim 1 wherein said mercaptan is tert-hexyl mercaptan.
9. The method of claim 1 wherein said mercaptan is tert-actyl mercaptan.
10. A fuel capable of spontaneous ignition with an oxidizer, which fuel consists essentially of a mixture of from 10 to 90 mol percent of a five-membered heterocyclic compound selected from the group of heterocyclic compounds having the following structural formula:

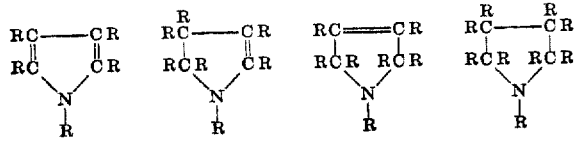

wherein R is selected from the group consisting of hydrogen, alkyl, alkenyl, aryl, aralkyl and alkaryl radicals having not more than 12 carbon atoms and cycloalkyl and cycloalkenyl radicals having from 5 to 6 carbon atoms, the total number of carbon atoms being not greater than 16, and from 90 to 10 mol percent of a mercaptan selected from the group consisting of tert-butyl mercaptan, tert-hexyl mercaptan, and tert-octyl mercaptan.

11. The fuel of claim 10 wherein said heterocyclic compound is pyrrole.
12. The fuel of claim 10 wherein said heterocyclic compound is pyrrolidine.
13. The fuel of claim 10 wherein said heterocyclic compound is pyrroline.
14. The fuel of claim 10 wherein said heterocyclic compound is N-n-butylpyrrole.
15. The fuel of claim 10 wherein said heterocyclic compound is N-ethylpyrrolidine.
16. The fuel of claim 10 wherein said mercaptan is tert-butyl mercaptan.
17. The fuel of claim 10 wherein said mercaptan is tert-hexyl mercaptan.
18. The fuel of claim 10 wherein said mercaptan is tert-octyl mercaptan.
19. A fuel consisting essentially of a mixture of from 10 to 90 mol percent of pyrrole and from 10 to 90 mol percent of tert-butyl mercaptan.
20. A fuel consisting essentially of a mixture of from 10 to 90 mol percent of N-n-butylpyrrole and from 10 to 90 mol percent of tert-butyl mercaptan.
21. A fuel consisting essentially of a mixture of from 10 to 90 mol percent of pyrrolidine and from 10 to 90 mol percent of tert-butyl mercaptan.
22. A fuel consisting essentially of from 10 to 90 percent by volume of a liquid hydrocarbon in the $C_5$ to $C_{16}$ range, and from 90 to 10 percent by volume of a mixture consisting essentially of from 10 to 90 mol percent of a five-membered heterocyclic compound containing 1 nitrogen and 4 carbon atoms in the ring and having not more than 16 carbon atoms per molecule and from 90 to 10 mol percent of a mercaptan selected from the group consisting of tert-butyl mercaptan, tert-hexyl mercaptan, and tert-octyl mercaptan.
23. The fuel composition of claim 22 wherein said heterocyclic compound is pyrrole.
24. The fuel composition of claim 23 wherein said mercaptan is tert-butyl mercaptan.
25. The fuel composition of claim 22 wherein said heterocyclic compound is N-n-butylpyrrole.
26. The fuel composition of claim 22 wherein said mercaptan is tert-butyl mercaptan.
27. The fuel composition of claim 22 wherein said heterocyclic compound is pyrrolidine.
28. The fuel composition of claim 22 wherein said mercaptan is tert-butyl mercaptan.
29. The fuel composition of claim 22 wherein said heterocyclic compound is a pyrroline.
30. The fuel composition of claim 29 wherein said mercaptan is tert-butyl mercaptan.
31. The fuel composition of claim 22 wherein said heterocyclic compound is N-ethylpyrrolidine.
32. The fuel composition of claim 31 wherein said mercaptan is tert-butyl mercaptan.
33. A fuel capable of spontaneous ignition with an oxidizer, which fuel consists essentially of a mixture of from 10 to 90 mol percent of a five-membered heterocyclic compound containing 1 nitrogen and 4 carbon atoms in the ring and having not more than 16 carbon atoms per molecule, and from 90 to 10 mol percent of a mercaptan selected from the group consisting of tert-butyl mercaptan, tert-hexyl mercaptan, and tert-octyl mercaptan.
34. A fuel composition consisting essentially of from 10 to 90 percent by volume of liquid hydrocarbon in the $C_5$ to $C_{35}$ range, and from 90 to 10 percent by volume of a mixture consisting essentially of from 10 to 90 mol percent of a five-membered heterocyclic compound containing 1 nitrogen and 4 carbon atoms in the ring and having not more than 16 carbon atoms per molecule and from 90 to 10 mol percent of a mercaptan selected from the group consisting of tert-butyl mercaptan, tert-hexyl mercaptan, and tert-octyl mercaptan.

References Cited in the file of this patent

UNITED STATES PATENTS

| 2,557,018 | Viles | June 12, 1951 |
| 2,573,471 | Malina et al. | Oct. 30, 1951 |
| 2,750,732 | Condit et al. | June 19, 1956 |

UNITED STATES PATENT OFFICE

CERTIFICATE OF CORRECTION

Patent No. 2,943,439                                                  July 5, 1960

Cleveland R. Scott

It is hereby certified that error appears in the printed specification of the above numbered patent requiring correction and that the said Letters Patent should read as corrected below.

Column 5, line 23, claim 9, for "tert-actyl" read -- tert-octyl --; line 49, claim 13, for "is pyrroline" read -- is a pyrroline --.

Signed and sealed this 10th day of January 1961.

(SEAL)
Attest:

KARL H. AXLINE
Attesting Officer

ROBERT C. WATSON
Commissioner of Patents